(12) United States Patent
Woods et al.

(10) Patent No.: US 8,307,753 B2
(45) Date of Patent: Nov. 13, 2012

(54) FLUIDIC ARTIFICIAL MUSCLE ACTUATOR AND SWAGING PROCESS THEREFOR

(75) Inventors: Benjamin K. S. Woods, College Park, MD (US); Curt Kothera, Crofton, MD (US); Norman M. Wereley, Potomac, MD (US)

(73) Assignees: Techno-Sciences, Inc., Calverton, MD (US); University of Maryland, Riverdale, MD (US)

( * ) Notice: Subject to any disclaimer, the term of this patent is extended or adjusted under 35 U.S.C. 154(b) by 633 days.

(21) Appl. No.: 12/456,139

(22) Filed: Jun. 11, 2009

(65) Prior Publication Data

US 2009/0301292 A1 Dec. 10, 2009

Related U.S. Application Data

(63) Continuation-in-part of application No. 11/502,360, filed on Aug. 11, 2006, now Pat. No. 7,837,144.

(60) Provisional application No. 61/131,719, filed on Jun. 11, 2008.

(51) Int. Cl.
*F01B 19/04* (2006.01)

(52) U.S. Cl. .......................................................... 92/92

(58) Field of Classification Search .................. 92/90–92
See application file for complete search history.

(56) References Cited

U.S. PATENT DOCUMENTS

| 4,008,008 A | * | 2/1977 | Vergnet | 92/92 |
| 4,615,260 A | * | 10/1986 | Takagi et al. | 92/92 |
| 4,733,603 A | * | 3/1988 | Kukolj | 92/92 |
| 5,165,323 A | * | 11/1992 | Sato | 92/92 |

* cited by examiner

*Primary Examiner* — F. Daniel Lopez
(74) *Attorney, Agent, or Firm* — Ober, Kaler, Grimes & Shriver; Royal W. Craig

(57) ABSTRACT

A fluidic artificial muscle actuator consisting of an inner elastic bladder surrounded by a braided filament sleeve and sealed off on either end with end fittings. Pressurization of the actuator produces force and/or motion through radial movement of the bladder and sleeve which forces the sleeve to move axially. Both contractile and extensile motions are possible depending on the geometry of the braided sleeve. The fluidic artificial muscle actuator is manufactured using a swaging process which plastically deforms swage tubes around the end fittings, braided sleeve, and pressure bladder, creating a strong mechanical clamping action that may be augmented with adhesive bonding of the components. The swaging system includes the swaging die and associated components which are used to plastically deform the swage tube during assembly of the actuator.

18 Claims, 3 Drawing Sheets

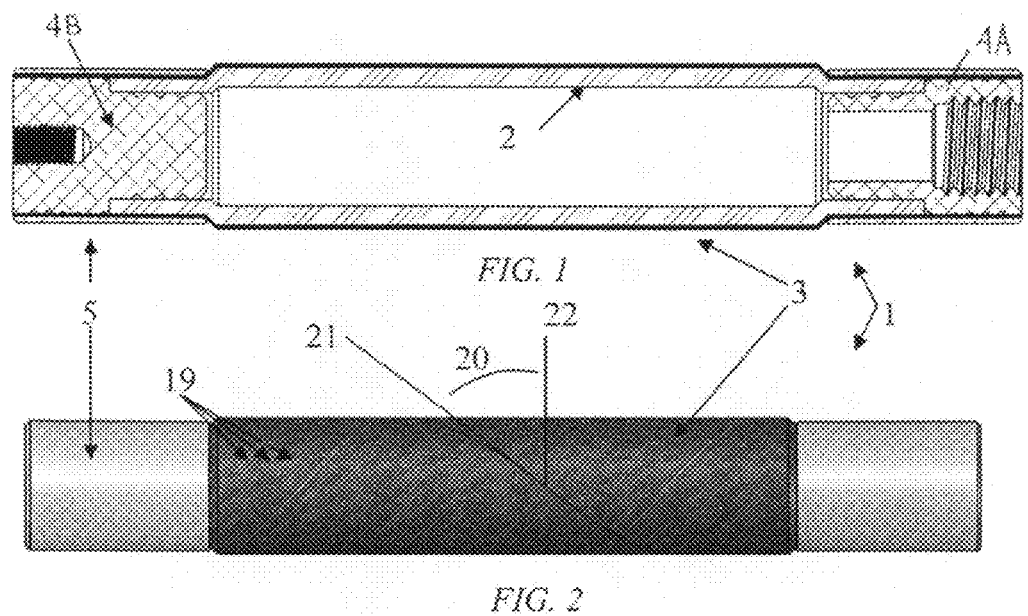
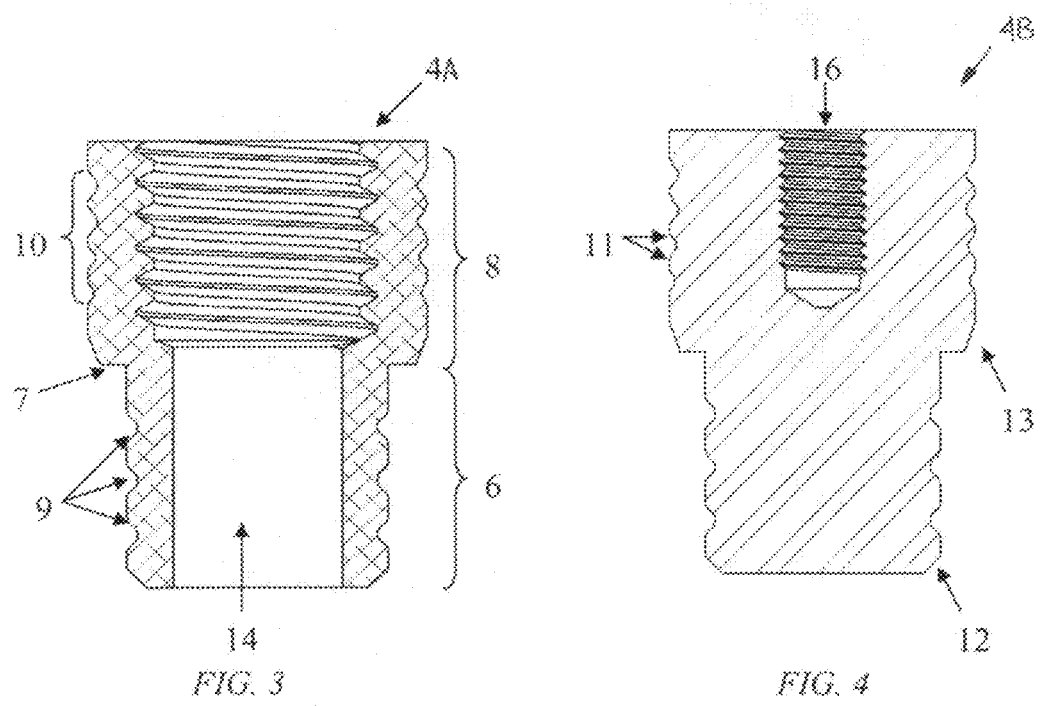

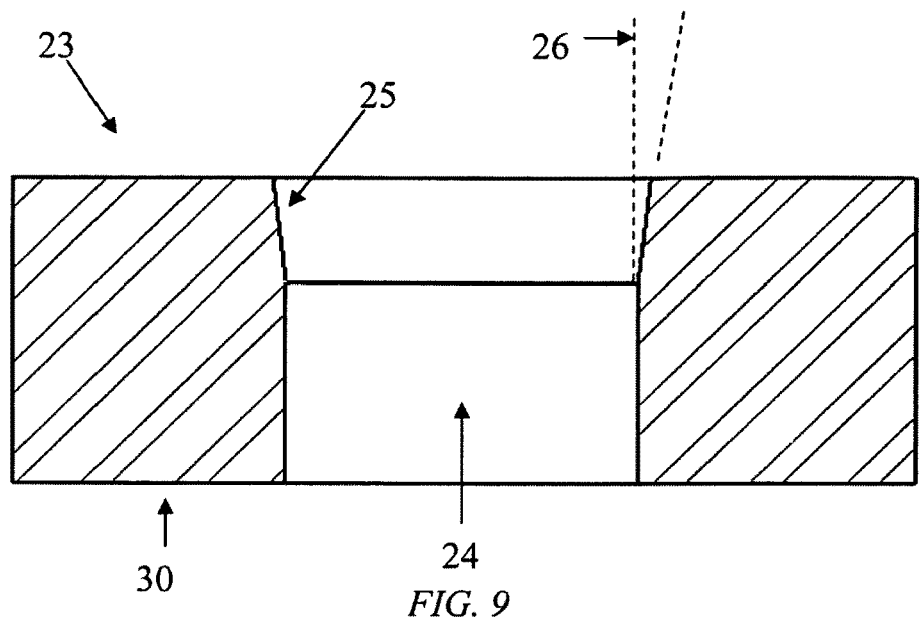
FIG. 9
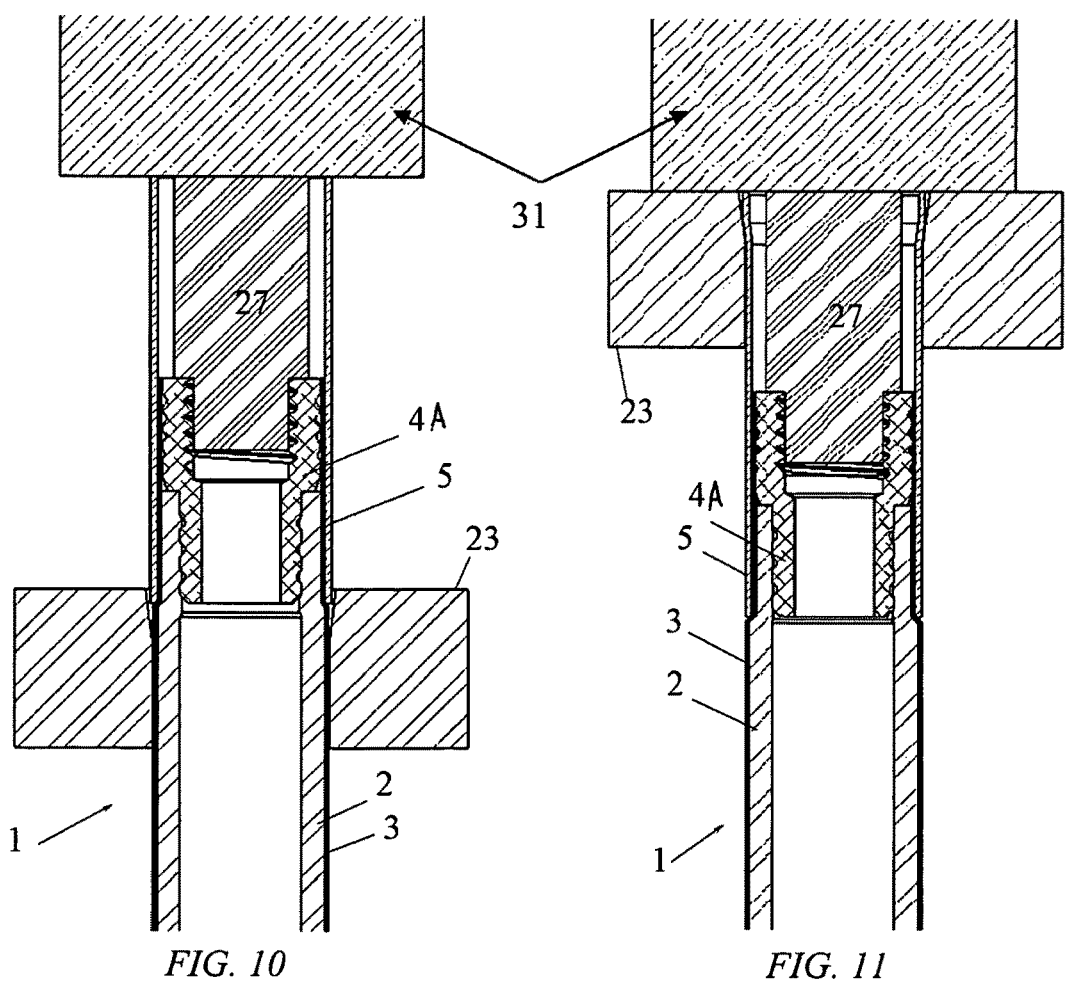
FIG. 10
FIG. 11

FLUIDIC ARTIFICIAL MUSCLE ACTUATOR AND SWAGING PROCESS THEREFOR

CROSS-REFERENCE TO RELATED APPLICATION(S)

The present application is a continuation-in-part of U.S. application Ser. No. 11/502,360 filed Aug. 11, 2006, now U.S Pat. No. 7,837,144 and further derives priority from U.S. provisional application Ser. No. 61/131,719 filed 11 Jun. 2008.

BACKGROUND OF THE INVENTION

1. Field of the Invention

The present invention generally relates to actuators used for performing mechanical work and, more particularly, to fluidic artificial muscles, artificial muscle actuators, or McKibben artificial muscles.

2. Description of Prior Art

Fluidic artificial muscles (also known as artificial muscle actuators, or McKibben artificial muscles, among other names), are simple mechanical actuators that harness pressurized fluid (air, water, oil, etc.) to generate significant forces and deflections.

Fluidic artificial muscles commonly comprise an inner elastic fluid bladder surrounded by a stiff braided sleeve that is sealed on each end to allow for pressurization, though co-cured bladder-braid, layered helical windings, and straight fibers are also options.

The operating principle of fluidic artificial muscles is as follows. Pressurization will produce force and motion, either contractile or extensile, due to the interaction between the bladder and braided sleeve. The inner elastic bladder is pressurized with a fluid such as air or oil, causing an inflation and expansion of the bladder. The braided sleeve around the bladder is thereby forced to expand. However, the fixed length of the stiff sleeve fibers generates a contractile or extensile force along the main axis of the actuator, in addition to relative motion between the two end fittings. The direction of force and motion are dependent on the initial angle between the filaments of the braided sleeve. For a contractile actuator, the bladder expansion is radial and for an extensile actuator, the bladder expansion is primarily axial. This force and motion is transferred to an external system via the end fittings.

Fluidic artificial muscle actuators of this type have been known in prior patent publications. A related device was disclosed in April 1957 in U.S. Pat. No. 2,789,580. Many different designs have been disclosed over the years (U.S. Pat. Nos. 2,844,126, 4,733,603, and 4,751,869), but few of these have led to successful commercialization. Some more recent designs, such as those disclosed in (U.S. Pat. Nos. 4,615,260 and 6,349,746), have led to commercial products. Fluidic artificial muscles have attracted interest in the fields of robotics, industrial automation, and recently aerospace engineering (see applicant's co-pending U.S. patent application Ser. No. 11/502,360) because of their simple design, light weight, compliance, and excellent performance in terms of forces and deflections generated.

SUMMARY OF THE INVENTION

In accordance with the foregoing objects, the present invention is a fluidic actuator and the manufacturing process used to produce it. The actuator includes a braided sleeve with helically wrapped filaments surrounding an inner pressure bladder made from a softer, elastic material. These components act together upon internal bladder pressurization with a fluid medium to generate force and/or motion. If the length of the actuator is fixed during pressurization, then the actuator will generate its maximum force, known as the blocked force. If the ends of the actuator are free to move with no external loading, then the actuator will produce its maximum displacement, which is known as the free contraction, or free extension depending on the direction of motion. Typical use of the actuator in a system will require that both a force and a displacement be generated. In this case the force will be something less than the blocked force and the displacement will be something less than the free contraction/extension, depending on the loading conditions. In order to transfer the output mechanical work (force and displacement) to an external system and to seal the actuator for pressurization, a set of end fittings is installed, with one on each end. These end fittings may have special features to facilitate installation into a machine, apparatus, or other external system. At least one of these end fittings is provided with an air inlet/outlet to allow for pressurization and/or depressurization.

A new end fitting design and manufacturing technique has been invented that produces a simple and robust connection with high tensile strength, high bursting pressures and long fatigue life. This process uses a conical steel die 23 to swage a thin walled tube around the specially designed end fittings, braided sleeve, and bladder. The plastic deformation that occurs during the swaging process is axisymmetric and serves to clamp the sleeve and tube to the end fitting. Additionally, adhesive may be spread onto the outer surfaces of the end fittings themselves and/or to the section of the sleeve and/or bladder that comes into contact with the end fittings before the swaging assembly process is begun, during assembly, or after its completion to increase the mechanical strength of the actuator and to ensure a pressure tight seal.

The invented process is simple and low cost to implement. Additionally, the quality and reliability of the finished device are high, so the reduced manufacturing costs do not come at the expense of actuator performance. The object of this invention is therefore to establish a fluidic artificial muscle design and simple fabrication procedure. The invention disclosed here is applicable to a wide range of applications including factory automation, prosthetics and robotics, and aerospace vehicle control, amongst many others.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 1 shows a cross section view of an embodiment of a swaged fluidic artificial muscle actuator in a non-active state.

FIG. 2 is an external view of an embodiment of a swaged fluidic artificial muscle showing the braided sleeve structure and smooth outer contour of the swage tubes.

FIG. 3 shows a cross section view of one embodiment of the end fittings. In this instance a through hole is provided for fluid flow into the actuator during pressurization. Additionally a threaded feature is included at the end of the fitting to allow for connection of the actuator to other components.

FIG. 4 shows a cross section view of a second embodiment of the end fittings. In this instance the end fitting includes a tapped hole at the outside of the fitting to allow attachment of the actuator to other components.

FIG. 9 is a cross section view of an embodiment of the swaging die.

FIG. 10 shows a cross section view of the swaging system during manufacturing.

FIG. 11 shows another cross section view of the swaging system during manufacturing.

DETAILED DESCRIPTION OF THE PREFERRED EMBODIMENTS

Figure 5:
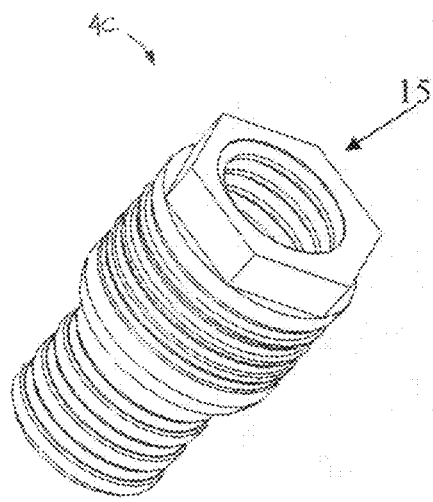
FIG. 5 shows an isometric view of another embodiment of the end fittings. This embodiment includes a hexagonal extension of the end fitting which allows for application of torque to the assembled actuator for installation into some system.

The present invention is an improved fluidic actuator and a manufacturing process to produce it.

With combined reference to FIGS. 1 and 2, the actuator 1 comprises an inner elastic fluid bladder 2 surrounded by a stiff braided sleeve 3. End fittings 4 are attached to each end to seal the bladder 2 and allow for connection of the actuator 1 to other component(s). A swage tube 5 is fitted around a set of end fittings 4 (shown here as two different end fittings 4A, 4B), sandwiching the braided sleeve 3 and bladder 2 as shown. The swage tube 5 has a constant wall-thickness and constant-diameter, and upon fitting is plastically deformed to provide a fluid seal and a strong mechanical connection.

The end fittings 4A, 4B are preferably constructed from a lightweight but strong material such as, but not limited to, aluminum, titanium, plastic, or fiber reinforced polymer. These can be machined, molded, or manufactured in any other way which allows for the necessary features and tolerances to be produced.

The end fittings 4A, 4B are primarily cylindrical and feature a stepped outer diameter, with two or more different diameters along their length. The stepped diameters create separate clamping regions for the braided sleeve 3 and bladder 2 that allows for different braid/bladder thicknesses and different amounts of compression. Though two different end fittings 4A, 4B are herein shown, the set of fittings may comprise similar or different structural configurations, and as described below may include other features not shown in FIG. 1. The end fittings may herein referred to in a generic sense as end fittings 4.

As seen in FIG. 3, a first clamping region 6 extending from the inside face of the fitting 4A (and 4B) to the first step 7, is preferably used to clamp both a portion of the braided sleeve 3 and the terminal ends of the bladder 2. This first clamping region 6 primarily serves the purpose of sealing the interior of the actuator 1 so that it may be pressurized. Rigid epoxy, or a more flexible adhesive or sealant, such as silicone or polyurethane based glues, may be applied between the bladder 2 and end fitting 4A (and 4B) before swaging (per below). Adhesive/sealant can also be applied between the braid 3 and bladder 2, and between the braid 3 and swage tube 5 over this clamping region 6 if desired, and this may be done so at any time before, during, or after the assembly. The bladder 2 encircles the swage tube 5 up to the first step 7, with the step 7 providing a positioning reference during assembly. A second clamping region 8 extends from the first step 7 to the end of the fitting 4A (same with fitting 4B). This second clamping region 8 has a larger outer diameter because it is intended to clamp only the braid 3 to the end fittings 4A, 4B. The exact diameter used depends on the thickness of the braid filaments, the inner diameter of the swaging die, swage tube wall thickness, and the desired amount of braid compression. Preferably, adhesive/sealant is also applied over this clamping region, both between the braid 3 and end fittings 4A, 4B and between the braid 3 and swage tube 5.

Depending on the embodiment, the clamping regions 6, 8 of the end fitting might include surface texture features to increase the quality of the seal and/or the failure strength of the final swaged assembly. In the embodiment shown, the first clamping region 6, that is, the pressure bladder sealing region, includes three annular grooves 9 concentric with the main axis of the end fitting 4A (the same being true of fitting 4B). These grooves 9 are filled with adhesive before swaging and when cured, forming features that mimic O-rings to ensure a tight seal. Additionally these grooves 9 help prevent the bladder 2 from being pulled out. Also in the shown embodiment, the braided sleeve clamping region 8 includes annular grooves 10 of a sophisticated annular ribbed design that greatly improves the ultimate strength of the actuator 1. These annular grooves 10 provide recessed interstitial regions where the braid is not compressed during swaging. These uncompressed regions of the braid are thicker than the compressed braid that is directly between the end fitting 4 outer diameter and the swage tube 5. This alternating thickness greatly increases mechanical strength by requiring more force to pull the braid 3 filaments out of the braid clamping region 8 of the end fittings 4A, 4B. These grooves 10 can be varied in width, depth, spacing, profile, density, helical pitch angle (such as that in screw threads), and number to tailor the stress distributions and the transfer of the force from the braided sleeve 3 to the end fittings 4A, 4B. The same geometry need not be used for all of the grooves 10. In the preferred embodiment shown, the depth of the grooves 10 increases from the start of the braid clamping region 8 to the end of the fitting 4A, 4B so as to provide a progressive clamping action, thus, reducing stress concentrations and increasing strength. Other roughening techniques to increase strength and bonding may also be employed in addition to or in place of those noted. These include, but are not limited to, scoring, knurling, and cross-hatching.

The end fittings 4A, 4B may also contain other features, including but not limited to chamfers and fillets, at various places to reduce the stresses seen by the braid 3 and the bladder 2 during inflation/deflation and/or during extension/contraction. In the preferred embodiment, these include a series of fillets 11 on the annular grooves of the braid clamping region 8, a chamfer 12 on the inside edge of the end fittings to prevent tearing or cutting of the bladder with extension, and a chamfer 13 on the first diameter step at the beginning of the braid clamping region 8 to reduce braid stresses during both inflation/deflation and extension/contraction.

The end fittings 4 may incorporate other features that need not be directly related to the clamping of the braid 3 and bladder 2, but that enhance functionality of the actuator 1.

For example, tapped holes or threaded extrusions may be included on the end of the fitting to allow for mechanical attachment to other components. For example, with reference to FIG. 4, the end fitting 4B includes a tapped hole 16 at the outside of the fitting to allow attachment of the actuator 1 to other components.

Referring back to FIG. 3, other features may include pressurization ports 14 formed as holes through the length of one or both of the fittings 4A, 4B to allow for pressurization with the desired fluid medium. These pressurization ports 14 may be through or tapped. They may also include internal features to optimize fluid flow such as chamfers, flow channels, or venturi nozzles.

Still other additional features may be included to aid in installation of the actuator 1 into equipment or external systems. As seen in FIG. 5, an alternate fitting 4C (otherwise similar to 4A) may additionally include polygonal extensions 15 of the fitting length (square, hexagonal, etc.) to allow for the application of torque to the actuator 1 for installation or removal. Similarly, radially spaced holes (not shown) may instead be included to allow for the use of a spanner wrench to apply torque.

Safety features may also be included on the end fittings 4(A-C) prior to beginning the swaging assembly process or after completion thereof. An example of one such embodiment includes but is not limited to devices which externally or internally connect the two end fittings 4 in such a way so as not to impede ordinary actuator 1 operation.

Figure 7:
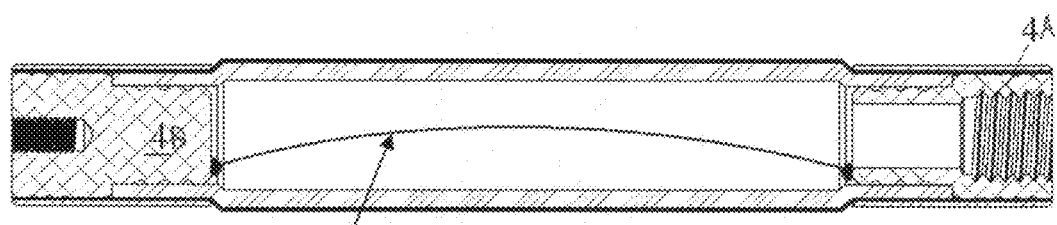
FIG. 7 shows a Swaged Fluidic artificial muscle with a slack wire safety device installed.

As seen in FIG. 7, an internal connector may include an initially slack safety wire 17 that is attached to both end fittings 4A, 4B. The purpose of safety wire 17 is to prevent damage to surrounding equipment, devices, bystanders, etc. in the event of failure when at least one of the end fittings 4A, 4B is destructively removed from the body of the actuator 1.

Figure 8:
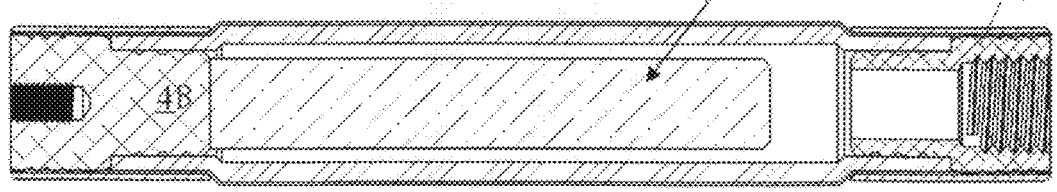
FIG. 8 shows a Swaged Fluidic artificial muscle with an end stop rod/partial volume fill installed.

Conversely, a feature may be appended, machined, or otherwise attached to at least one of the end fittings 4, either internal or externally, to prevent excess displacement by serving as an end-stop type of device. For example, with reference to FIG. 8, a contractile actuator is shown with a solid rod 18 (metal, plastic, rubber, etc.) installed or otherwise attached to the inner face of an end fitting 4B that has a length designed so that the contractile stroke is limited to a predetermined range, causing the end fitting 4A to essentially bottom out.

It may be desirable for reasons of efficiency or operating bandwidth to fill the internal volume of the pressure bladder 2. A decrease in the internal volume from either partial or complete filling of the resting volume of the actuator 1 will result in a decrease in the volume of pressurized fluid required to inflate the actuator 1. Reducing the volume of pressurized fluid reduces the amount of work that must be put into the actuator for a given loading condition. If the volume filling scheme is designed in such a way that it does not interfere with the transfer of pressure from the inner face of the bladder 2 to the braided sleeve 3, then the force and displacement performance characteristics of the actuator 1 will not be affected by the volume filling. Therefore under a given loading condition the work produced by the actuator 1 will not change for a well designed volume filling approach. Reducing work put into the actuator 1 while maintaining work produced will result in a direct increase in operating efficiency for the actuator 1. This approach can be particularly useful for higher frequency applications because in addition to increasing efficiency, it will decrease the fluid flow rate required of the fluid supply system at any given operating frequency, pressure, and loading conditions. In the preferred embodiment, a volume filling scheme could employ a solid rod similar to the end-stop device 18 of FIG. 8. The end of the rod nearest the air inlet may be specially shaped to improve airflow around the rod. A small gap may be included around the rod to allow for pressurization of the space between the rod 18 and bladder 2. Many other types of volume filling could be used without changing the invention, including but not limited to hollow rods, flexible plugs (e.g. rubber), porous media, particulates, beads, shot, internal fluid filled bladders, etc.

In the above-described embodiments, the swage tube 5 is a constant wall thickness, constant diameter tube made from any suitable strong and ductile material (metal, polymer, fiber reinforced polymer, etc). The swage tube 5 outer diameter and wall thickness are chosen in concert with the die size and end fitting 4 geometry to produce the desired compression of the braided sleeve 3 and pressure bladder 2. Other swage tube 5 geometries can be utilized if modified clamping properties or additional features are desired. For instance, the swage tube 5 may have a tapered wall thickness or added surface roughness either inside (for added clamping strength) and/or outside (for torque application).

The swage tubes 5 may also be modified to contain features that encourage torque transfer, including but not limited to flat surfaces or holes, or threads to facilitate installation into a device either directly or through the attachment of an end cap or other such external fitting-type component.

The braided sleeve 3 in the above-described embodiments preferably comprises fiber filaments 19 braided in a helical fashion to form a sleeve that can expand or contract in diameter. While this is the preferred embodiment, the sleeve 3 may alternatively be comprised of different layers of helically wrapped filaments that are stacked instead of woven, where in the case of two layers, the two individual layers encircle the bladder in opposing directions. In another embodiment, the filaments may be aligned with the long axis of the actuator 1. These filaments could then be embedded into a soft (e.g. elastomer or rubber) matrix to maintain the spacing between fibers. Filament material can be any suitable high strength, high modulus material. Low friction and high wear resistance are also desirable in the braid material to reduce actuator self-heating and to extend fatigue life. Favored materials include but are not limited to aramid, para-aramid, carbon, or fiberglass fibers. Polymers such as Nylon, PEEK, Polyester (PET), and Ultra High Molecular Weight Polyethylene (UHMWPE), etc. are also highly applicable. Metallic filaments (steel, stainless steel, titanium, etc.) can also be used, although they are not preferred.

Viewing FIG. 2, the sleeve filament density (distance between strands 19) and initial braid angle 20 of the sleeve can be varied to influence the stiffness, force generation, deflection range, and other important actuator properties. Initial braid angle of the sleeve 20 is defined as the angle between a braid filament 21 and the radial axis of the actuator 22 when the sleeve 3 is tight against the pressure bladder 2 and the actuator 1 is at its resting length (no internal pressure, no external loading).

The pressure bladder 2 will preferably be made from a low modulus, elastic material such as an elastomer or rubber. Silicone, polyurethane, and latex rubbers are the preferred materials, although any suitable material may be used without changing the invention. These materials allow for the large strains associated with pressurization, while minimizing the amount of energy required to pressurize them. Wall thickness of the bladder 2 is chosen to ensure that the operating pressure can safely be maintained without rupture. Additional wall thickness may or may not be desired to allow for material loss during long term actuation cycling due to braided sleeve/bladder interactions, such as friction. Accordingly, the bladder 2 and/or braid 3 material may be coated in a complementary material to reduce friction, heating, etc. Examples include but are not limited to Teflon™ and dry film lubricant.

The braided sleeve 3 and pressure bladder 2 may be made as a single combined component. This can be accomplished by co-curing of the elastic bladder 2 material and the filaments of the braided sleeve 3. This manufacturing approach can be followed for any of the sleeve embodiments and geometries discussed above. Several manufacturing methods are applicable for this approach including, but not limited to, filament winding, automated fiber placement, casting, injection molding, resin transfer molding, and vacuum assisted resin transfer molding. Alternatively, pre-made bladder 2 and filament layers 3 can be consolidated into a single composite bladder/sleeve component through heat, pressure, material injection, and/or other methods.

As shown in FIG. 9, an exemplary swaging die 23 used to plastically deform the swage tubes 5 can be made form steel or any suitably hard, wear-resistant material (ceramic, metal, etc.). The die 23 may be hardened through heat treatment and/or it may be coated with a highly wear resistant material such as chrome, titanium carbonitride, or other to increase operational life. The swaging feature of the die 23 is a precision bored through-hole 24 of the desired final outer diameter of the swage tube 5. Gradual swaging is achieved by expanding the swaging through-hole 24 into a frusto-conical orifice 25. The angle 26 of this frusto-conical orifice 25 can be varied to change the amount of force required to perform the swage. Alternatively, a fillet or variable radius curve can be used to provide the gradual progression of the swage. The distal opening of frusto-conical orifice 25 should be wider than the starting outer diameter of the swage tube 5.

Figure 6:
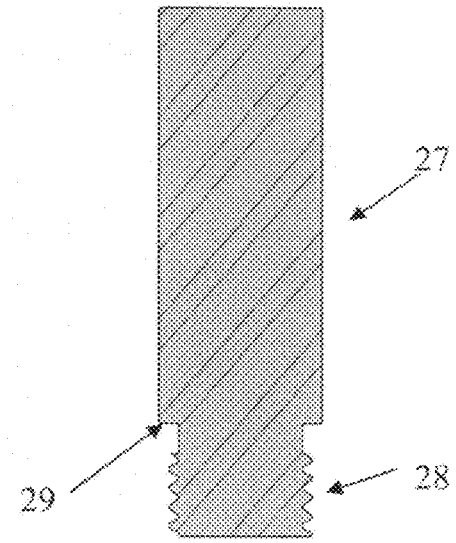
FIG. 6 is a cross section of a swage tube standoff tool.

As shown in FIG. 6, a swage tube standoff tool 27 is an optional component of this invention that is used to position the swage tube 5 in a desired location relative to the end fittings 4 during assembly. In the preferred embodiment, this tool 27 has a threaded stud 28 which screws into the back of each end fitting 16 until the threads bottom out on a mating reference surface 29. The rest of the tool 27 may be a solid rod of precisely known height. The swage tube standoff tool 27 can be made from any suitably strong and stiff material, with metals being the favored choice. Once the end fitting is screwed onto the standoff tool, the solid rod end of the tool is aligned with the end of the swage tube (concentric and coplanar). By controlling the length of the standoff tool 27 and the length of the swage tube 5, the position of the inside edge of the swage tube 5 can be controlled relative to the inside edge of the end fitting 4. The swaging force is then applied through both the swage tube 5 and the standoff tool 27 simultaneously, maintaining the desired relative position of the swage tube 5 and end fitting 4. This tool 27 is not necessary if the precise position of the swage tube 5 relative to the is not critical for the given application, or if some other means of maintaining alignment is used, such as an appropriately shaped extension of the face of the press used to applying force during swaging.

The manufacturing process proceeds as follows. The pressure bladder 2 and braided sleeve 3 are first cut to appropriate lengths, determined by the final desired actuator 1 length and the desired lengths of the clamping regions 6, 8 on the end fittings 4. The components of the first end are then assembled. This starts by sliding the bladder 2 onto the first end fitting 4 the desired amount with or without adhesive/sealant between the bladder 2 and end fitting 4. The braided sleeve 3 is then pulled over the bladder 2 and end fitting 4. Adhesive/sealant may be applied between the bladder 2 and braid 3 and/or between the braid 3 and end fitting 4. Additional adhesive may be applied around the outside of the braided sleeve 3 to adhere it to the swage tube 5. A length of swage tube 5 then slides over the sleeve/bladder/end fitting assembly. Preferably, the inside end of the swage tube 5 is aligned with the inside end of the end fitting 4. This can be done using the swage tube standoff tool 27 (FIG. 6), or with any other suitable means. This first end is then "swaged" by forcing it through the swaging feature 24 of the die 23 (FIG. 9). The free ends of the bladder 2 and braided sleeve 3 are fed through the swaging die 23 and pulled through it until the swage tube 5 of the first end assembly comes to rest on the conical feature 25 of the swaging die. Force is then applied to the swage tube 5 and the top of the standoff tool 27 (if used) to push the assembled first end through the swaging feature of the die 23. This will cause a reduction of the swage tube 5 diameter, forcing the tube 5 down around the bladder 2 and braided sleeve 3. The bladder 2 and braided sleeve 3 will therefore be compressed between the end fitting 4 and swage tube 5 with a certain amount of clamping pressure that is determined by the geometries of the various components of the actuator 1 and the swaging die 23.

Any means of applying sufficient force to plastically deform the swage tube 5 can be used to perform the actuator swaging. In the preferred embodiment, this is a manual, pneumatic, or hydraulic press 31.

FIG. 10 shows a cross section view of the swaging system during manufacturing using hydraulic press 31 with no force applied. FIG. 11 shows another cross section view of the swaging system during manufacturing with force applied to the press 31 in FIG. 10.

In FIG. 10, the components for one end of the actuator 1 (swage tube 5, end fitting 4, braided sleeve 3, bladder 2, adhesive) have been assembled and slid into the swage die 23. A swage tube standoff tool 27 is installed into the end fitting 4 and the face of the mechanical press 31 has been lowered down onto the swage tube 5 and swage tube standoff tool 27. Note that the tops of the swage tube 5 and swage tube standoff tool 27 are aligned, providing a precise means of positioning the end fitting 4 relative to the swage tube 5.

In FIG. 11, the press 31 has forced the components of this end of the actuator 1 through the swaging die 23. The diameter of the swage tube 5 has been reduced, thereby clamping the components together. At this point the swaging operation is complete. The press 31 is backed off, the swage tube standoff tool 27 is unscrewed and removed from the assembly, after which the excess swage tube 5 above the end fitting 4 is cut off.

It is desirable that the press or other force application means be designed with features to align the assembled components of the actuator axially with the swaging feature in the swage die to ensure a straight swage.

To swage the second end of the actuator 1, the free end of the braided sleeve 3 and bladder 2 must first be drawn through the die 23 with the first swaged end on the bottom side of the die 30. Then the second end can be assembled and swaged exactly as described for the first end.

It should now be apparent that the above-described actuator 1 design and manufacturing technique produces a simple and robust connection with high tensile strength, high bursting pressures and long fatigue life.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A fluidic artificial muscle actuator comprised of:
   a pressure bladder comprising an elastic wall open at opposing terminal ends and enclosing an internal volume there between;
   a pair of axisymmetric end fittings, each end fitting having a substantially cylindrical first clamping region of a first diameter stepped to a substantially cylindrical second clamping region of a second diameter greater than said first diameter, the first clamping regions of said pair of end fittings being inserted into a respective open terminal end of said pressure bladder;

a braided sleeve about said pressure bladder and encircling the first clamping regions of both of said end fittings; and a pair of substantially cylindrical swage tubes each encircling both of said first and second clamping regions of a respective end fitting and compressing a terminal end of said pressure bladder and a terminal end of said braided sleeve about the first clamping region of said end fitting by uniform radial compression;

said pair of swage tubes being clamped about their respective end fittings, pressure bladder and braided sleeve by a radial swaging process that plastically deforms the swage tubes about said end fittings to define a smooth, substantially cylindrical surface.

2. An actuator as in claim 1, wherein one of said pair of end fittings transfers mechanical work from the braided sleeve to an external system.

3. An actuator as in claim 1, wherein said pair of end fittings consist of two distinct clamping regions separated by a step, including said first clamping region of the first diameter for the braided sleeve and the pressure bladder, and said second clamping region of the second diameter for the braided sleeve alone.

4. An actuator as in claim 1, wherein one of said pair of end fittings includes a threaded extension for effective pressurization of the actuator.

5. An actuator as in claim 1, wherein one of said pair of end fittings includes any one from among a group consisting of through-holes or threaded ports, for connection of pressure line fittings.

6. An actuator as in claim 1, wherein said pair of end fittings includes a plurality of smooth annular grooves spaced over the second clamping region of the fitting to increase the mechanical strength of the swaged actuator.

7. An actuator as in claim 1, wherein said pair of end fittings includes surface features covering said second clamping region chosen from among the group of grooves, troughs, bumps, knurling, serrations, cross-hatching, and spirals.

8. An actuator as in claim 1, wherein said pair of end fittings are attached to said pressure bladder with an adhesive or sealant to provide a pressure tight seal.

9. An actuator as in claim 1, wherein said pair of end fittings include surface features covering the first clamping region chosen from among the group consisting of grooves, troughs, bumps, knurling, serrations, cross-hatching, spirals that increase the quality of the fluid seal and/or increase the pull out strength of the pressure bladder.

10. An actuator as in claim 1, wherein one of said pair of end fittings comprises a tapped hole for installation of the actuator into an external system.

11. An actuator as in claim 1, wherein said pair of end fittings both comprise a polygonal extension defined by angled surfaces for torque application during installation of the actuator.

12. An actuator as in claim 1, wherein said pair of end fittings include chamfered edges to reduce the stresses on the braided sleeve and pressure bladder under loading and during operation of the actuator.

13. An actuator as in claim 1, wherein the said braided sleeve comprises a plurality of different layers of helically wound stiff fibers embedded in the wall of said pressure bladder.

14. An actuator as in claim 1, wherein the braided sleeve and pressure bladder comprise a single co-cured composite with the braid filaments embedded into an elastic matrix.

15. An actuator as in claim 1, wherein at least one of said pressure bladder or braided sleeve are coated with an auxiliary material to reduce effects of friction, heating, and external wear.

16. An actuator as in claim 1, further comprising means for limiting the separation distance of the end fittings in the event of excessive stretching.

17. An actuator as in claim 1, further comprising a rod of fixed length inside said pressure bladder to limit contractile motion of the actuator.

18. An actuator as in claim 1, wherein said pair of swage tubes both comprise a cylindrical interior having a circular inner cross-section of uniform diameter from end-to-end along said cylindrical interior to uniformly clamp the braid.

* * * * *